(12) United States Patent
Crago

(10) Patent No.: US 8,768,951 B2
(45) Date of Patent: Jul. 1, 2014

(54) METHOD FOR POPULATING A LOCATION INFORMATION DATABASE USED IN THE DELIVERY OF EMERGENCY AND OTHER LOCATION-BASED SERVICES IN A VOIP ENVIRONMENT

(75) Inventor: William Barry Crago, Stouffville (CA)

(73) Assignee: BCE Inc., Verdun, Quebec (CA)

( * ) Notice: Subject to any disclaimer, the term of this patent is extended or adjusted under 35 U.S.C. 154(b) by 2224 days.

(21) Appl. No.: 11/378,413

(22) Filed: Mar. 20, 2006

(65) Prior Publication Data
US 2007/0220038 A1 Sep. 20, 2007

(51) Int. Cl.
*G06F 17/30* (2006.01)

(52) U.S. Cl.
USPC ............. 707/769; 707/999.104; 707/999.102; 707/E17.014; 709/220; 709/223; 709/225

(58) Field of Classification Search
None
See application file for complete search history.

(56) References Cited

U.S. PATENT DOCUMENTS

| | | | |
|---|---|---|---|
| 6,665,715 B1* | 12/2003 | Houri | 709/223 |
| 2004/0184584 A1* | 9/2004 | McCalmont et al. | 379/45 |
| 2005/0190892 A1* | 9/2005 | Dawson et al. | 379/37 |
| 2005/0220120 A1* | 10/2005 | Klausberger et al. | 370/395.53 |
| 2006/0147010 A1* | 7/2006 | Batni et al. | 379/202.01 |
| 2009/0172033 A1* | 7/2009 | Clark et al. | 707/104.1 |

OTHER PUBLICATIONS

OSS: Operation Support System, Network Dictionary, http://networkdictionary.com/telecom/oss.php, downloaded on Mar. 8, 2006, pp. 1 to 2.
Linux Dialin Server Setup Guide: PPP (Point-to-Point Protocol), http://library.n0i.net/linux-unix/administration/dialin-server/pers-5.html, downloaded on Mar. 8, 2006, pp. 1-4.
Cisco—PPPoE Baseline Architecture for the Cisco UAC 6400, Document ID: 12915, http://www.cisco.com/warp/public/794/pppoe_arch.html, downloaded on Mar. 8, 2006, pp. 1 to 7.
Answers.com, Dynamic Host Configuration Protocol, downloaded on Mar. 8, 2006, pp. 1 to 8.
Vicomsoft KnowledgeShare—PPPoE, KnowledgeShare—White Papers, http://www.vicomsoft.com/knowledge/reference/pppoe.html, downloaded on Mar. 8, 2006, pp. 1 to 4.
Overview, ATM Interfaces, http:www.juniper.net/techpubs/software/erx/junose61/swconfig-link/html/atm-config2.html, downloaded on Mar. 7, 2006, pp. 1 to 7.
Overview, PPPoE Stages, http://www.juniper.net/techpubs/software/erx/junose61/swconfig-link/html/pppoe-config2.html, downloaded on Mar. 7, 2006, pp. 1 to 4.

(Continued)

*Primary Examiner* — Anteneh Girma

(57) ABSTRACT

A method of populating a location information database for use in providing a location-based service to a host device that is an endpoint of a logical connection between the host device and a network access server. The method comprises receiving from the host device over the logical connection a request for network access; assigning a logical identifier to the host device in response to the receiving; determining a physical location associated with the endpoint of the logical connection; creating an association between the logical identifier and the physical location; and storing the association in the location information database.

39 Claims, 5 Drawing Sheets

(56) References Cited

OTHER PUBLICATIONS

Ericsson, Service Architecture and Quality of Service, EDA 3.0 Box and Blade, Nov. 2005.
Ana M. Pavlicic et al., The Role of DHCP and RADIUS in Lawful Interception, CAIA Technical Report 040105A, Jan. 2004, pp. 1 to 7.
Redsky Technologies: How E911 Works, http://www.redskytech.com/e911_Center/how_works, downloaded on Feb. 14, 2006, pp. 1 to 3.
National Emergency Number Association (NENA), VoIP-Packet Technical Committee, Interim VoIP Architecture for Enhanced 9-1-1 Services (i2), Issue 1 Dec. 6, 2005, pp. 1-181.

* cited by examiner

METHOD FOR POPULATING A LOCATION INFORMATION DATABASE USED IN THE DELIVERY OF EMERGENCY AND OTHER LOCATION-BASED SERVICES IN A VOIP ENVIRONMENT

FIELD OF THE INVENTION

The present invention relates generally to VoIP communications and, in particular, to a method for populating a location information database used in the delivery of location-based services, such as emergency services, to users of VoIP devices.

BACKGROUND OF THE INVENTION

One of the underpinnings of location-based services such as emergency services is the ability to determine the physical location from which a call has been made. For example, when an emergency call is made in the public switched telephone network (PSTN) using a plain old telephony service (POTS) phone, the emergency call sent through the PSTN specifies the directory number of the POTS phone. Due to the way in which the PSTN is configured, the directory number of each POTS phone corresponds to a fixed physical location (e.g., service address), and this relationship is maintained in an ALI database made available to PSAP operators. Thus, upon handling an emergency call specifying a given directory number, a PSAP operator who queries the ALI database using the given directory number will learn the address from which the emergency call was placed and, consequently, to which an emergency crew needs to be dispatched.

As voice-over-internet-protocol (VoIP) becomes the predominant technology used in the telecommunications industry, customers using VoIP devices (hereinafter "VoIP customers") will expect emergency services to be delivered when emergency calls are originated from such devices over a broadband network. However, some broadband service providers' networks are not natively compatible with the existing emergency infrastructure described above. In order to allow the delivery of emergency services to VoIP customers in a broadband network, the National Emergency Numbering Association (NENA) has proposed various architectures that can interface with the existing emergency infrastructure, thereby allowing existing PSAPs to handle emergency calls placed by VoIP customers.

Compounding the need to address the aforementioned issue of incompatibility with the existing emergency infrastructure is the need to address the issue of determining the physical location of the VoIP device from which an emergency call is originated. Specifically, because telephone numbers assigned to VoIP devices are not necessarily associated with a fixed address or location, the availability of the directory number of the VoIP device is not sufficient to allow the physical location of the VoIP device to be determined. This problem also prevents service providers from offering other location-based services to their VoIP customers.

In order to resolve the above issue in the emergency services context, NENA has proposed a so-called "i2" architecture, which provides a network element known as a location information server (LIS) that serves as a repository for location information. The LIS is configured with a mapping between, on the one hand, location information elements (in the form of civic addresses or geo-spatial location attributes) and, on the other, logical representations of the respective physical locations with which the location information elements are associated.

Using the LIS, VoIP devices will be able to receive information on their own physical locations so that this information is conveyed during an emergency call. Alternatively, a VoIP device may be assigned a unique key that is used as an index to the LIS, which key is conveyed during an emergency call and can be used to consult the LIS for the purposes of obtaining the physical location of the VoIP device.

However, one significant omission from NENA's proposed i2 architecture is any description of how to populate the LIS with accurate information. In fact, document NENA 08-001, Issue 1, Dec. 6, 2005, entitled "Interim VoIP Architecture for Enhanced 9-1-1 Services (i2)", hereby incorporated by reference herein, plainly states that "How the IP network actually determines the location and the protocol between the LIS and IP device is outside the scope of this document". Thus, there remains a need for a solution to the problem of determining a VoIP device's location, in order to enable the LIS to be populated.

SUMMARY OF THE INVENTION

The present invention provides a solution to the problem of determining a VoIP device's location, in order to allow VoIP customers to benefit from emergency services and other location-based services.

A first broad aspect of the present invention seeks to provide a method of populating a location information database for use in providing a location-based service to a host device that is an endpoint of a logical connection between the host device and a network access server. The method comprises receiving from the host device over the logical connection a request for network access; assigning a logical identifier to the host device in response to the receiving; determining a physical location associated with the endpoint of the logical connection; creating an association between the logical identifier and the physical location; and storing the association in the location information database.

A second broad aspect of the present invention seeks to provide a method of populating a location information database for use in providing a location-based service to a host device that is an endpoint of a logical connection between the host device and a network access server. The method comprises receiving from the host device over the logical connection a request for network access; assigning a logical identifier to the host device in response to the receiving; and providing the logical identifier to a computing apparatus capable of: (i) determining a physical location associated with the endpoint of the logical connection; (ii) creating an association between the logical identifier and the physical location; and (iii) storing the association.

A third broad aspect of the present invention seeks to provide a method of populating a location information database for use in providing a location-based service. The method comprises receiving a logical identifier assigned to a host device in response to receiving a request for network access from the host device over a logical connection having a first endpoint that is the host device and a second endpoint that is a network access server; determining a physical location associated with the endpoint of the logical connection; creating an association between the logical identifier and the physical location; and storing the association in the location information database.

A fourth broad aspect of the present invention seeks to provide a system for populating a location information database for use in providing a location-based service to a host device that is an endpoint of a logical connection between the host device and a network access server. The system comprises first means for receiving from the host device over the logical connection a request for network access; second means for assigning a logical identifier to the host device in response to the receiving; third means for determining a physical location associated with the endpoint of the logical connection; fourth means for creating an association between the logical identifier and the physical location; and fifth means for storing the association in the location information database.

These and other aspects and features of the present invention will now become apparent to those of ordinary skill in the art upon review of the following description of specific embodiments of the invention in conjunction with the accompanying drawings.

It is to be expressly understood that the description and drawings are only for the purpose of illustration of certain embodiments of the invention and are an aid for understanding. They are not intended to be a definition of the limits of the invention.

DETAILED DESCRIPTION OF EMBODIMENTS

Figure 1:
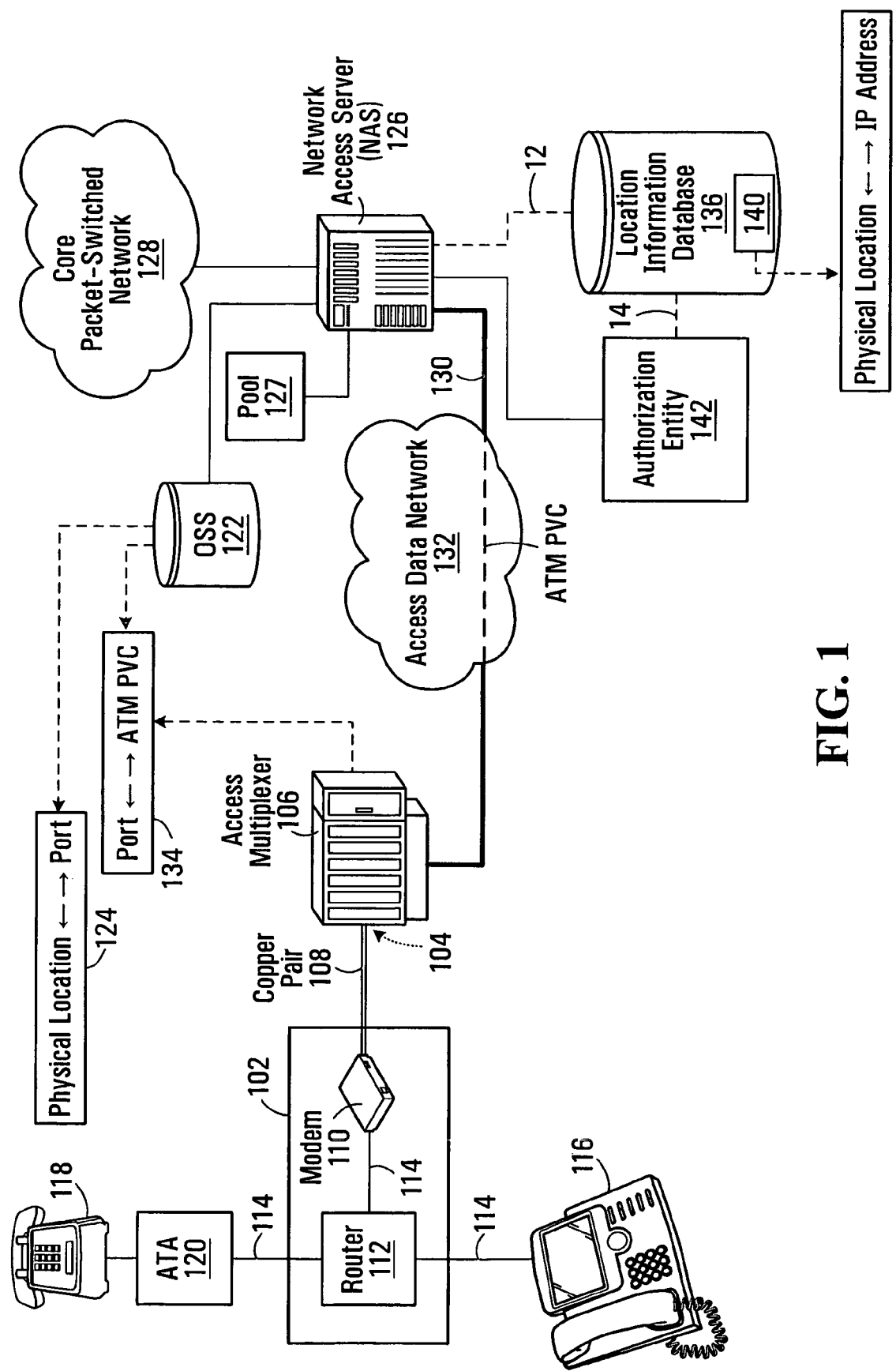
FIG. 1 is a diagrammatic representation of an infrastructure for the delivery of location-based services to a host device in a VoIP environment, in accordance with an example non-limiting embodiment of the present invention.

FIG. 1 shows various components of an infrastructure for delivering location-based services, including emergency services, to a VoIP device, in accordance with an example non-limiting embodiment of the present invention. The infrastructure comprises a VoIP device (hereinafter "host device" 102) connected to a port 104 of an access multiplexer 106 via a physical communication link 108. In an example non-limiting embodiment, the host device 102 may comprise a broadband modem 110 connected to a router 112 over a home network 114. The router 112 may in turn be connected over the home network 114 to a VoIP phone 116 or, alternatively, to a POTS phone 118 via an analog terminal adapter (ATA) 120. In an example non-limiting embodiment, the physical communication link 108 can be a copper twisted pair, over which higher-layer protocols allow for the exchange of packets. In an alternative embodiment, the physical communication link 108 might not a copper pair, but instead may comprise an Ethernet link, a fiber optic link (e.g., FTTH, FTTC), a fixed wireless link, a coax cable, etc., or a combination thereof.

The infrastructure of FIG. 1 further comprises an operation support system (OSS) 122. The OSS 122 generally represents a collection of systems that perform management, inventory, engineering, planning, and repair functions for the broadband service provider. In this light, one of the functions of the OSS 122 may include management of network elements, assets and equipment. Thus, the OSS 122 maintains a mapping 124 between, on the one hand, the ports of various access multiplexers under control of the broadband service provider and, on the other, location objects indicative of the respective physical locations of the host devices connected to those ports. In the specific case under consideration here, the mapping 124 maintained by the OSS 122 relates port 104 of the access multiplexer 106 to a location object indicative of the physical location of the host device 102. The location object may be expressed as a civic address or a set of geo-spatial coordinates (e.g., latitude/longitude).

The access multiplexer 106, which in an example non-limiting embodiment can be a digital subscriber line access multiplexer (DSLAM), is connected to a network access server (NAS) 126, which may also be referred to by some in the industry as a broadband remote access server (BRAS), a remote access server (RAS) or a broadband access server (BAS). The NAS 126 provides access to a core packet-switched data network 128, such as the Internet, over which VoIP calls can be established. In an example non-limiting embodiment, communication between the access multiplexer 106 and the NAS 126 may take place over a dedicated logical link 130 between the access multiplexer 106 and the NAS 126. The dedicated logical link 130 traverses an intervening access data network 132. In an example non-limiting embodiment, the dedicated logical link 130 can be implemented as an asynchronous transfer mode (ATM) permanent virtual circuit (PVC). In another example non-limiting embodiment, the dedicated logical link 130 can be implemented as a virtual local area network (VLAN). Still other implementations of the dedicated logical link 130 are within the scope of the present invention.

The functionality of the access multiplexer 106 is to allow data arriving from the NAS 126 along given ATM PVCs or VLANs to be sent over corresponding physical communication links via corresponding one of its ports, and vice versa. Thus, one can say that the access multiplexer implements a mapping 134 between, on the one hand, dedicated logical links and, on the other, ports of the access multiplexer 106. In the specific case under consideration here, the mapping 134 implemented by the access multiplexer 106 relates the dedicated logical link 130 to port 104 of the access multiplexer 106. In two example non-limiting embodiments, the mapping 134 can be maintained by either the access multiplexer 106 or the OSS 122.

The infrastructure of FIG. 1 further comprises an authorization entity 142 connected to the NAS 126. The nature of the connection between the NAS 126 and the authorization entity 142 is immaterial. In an example non-limiting embodiment, the authorization entity 142 can be a server (e.g., an AAA server) responsive to queries from the NAS 126. In such an embodiment, the authorization entity 142 and the NAS 126 may communicate using the so-called "Remote Authentication Dial In User Service" (RADIUS) protocol, a description of which is available at www.ietf.org/rfc/rfc2865.txt. In another example non-limiting embodiment, the authorization entity 142 can be a functional element integrated with the NAS 126.

Also provided in the infrastructure of FIG. 1 is a location information database 136, which can be implemented as a computing apparatus. In some embodiments, the location information database 136 can be connected to the NAS 126 by a link 12, while in other embodiments, the location information database 136 can be connected to the authorization entity 142 by a link 14. The nature of the connection between the location information database 136 and either the NAS 126 or the authorization entity 142 is immaterial. In other embodiments, the location information database 136 may be integrated with either the OSS 122, the NAS 126 or the authorization entity 142. In yet other embodiments, the location information database 136 may be distributed amongst a plurality of functional elements and/or physical locations. It should be further appreciated that the location information database 136 can be managed, maintained and/or updated by an entity that may be the same entity as, or a different entity from, the entity that is responsible for providing the host device 102 with access to the core packet-switched data network 128.

In an example non-limiting embodiment, the location information database 136 can be implemented as a location information server (LIS) described in the document NENA 08-001, Issue 1, Dec. 6, 2005, entitled "Interim VoIP Architecture for Enhanced 9-1-1 Services (i2)", hereby incorporated by reference herein. To this end, the location information database 136 may comprise a plurality of records 140, each record 140 mapping a location object to a logical identifier. In an example non-limiting embodiment, the location object can be expressed as a civic address or a set of geo-spatial coordinates (e.g., latitude/longitude) indicative of a physical location. In various example non-limiting embodiments, the logical identifier may be an IP address in compliance with, e.g., IPv4 or IPv6, or a proprietary address, label or tag.

In an example non-limiting embodiment, the NAS 126 may be operative to maintain a pool 127 of pre-allocated logical identifiers that can be used by various host devices, including the host device 102. In an example non-limiting embodiment, the pool 127 of logical identifiers may be built up as a cooperative effort between the NAS 126 and the OSS 122, while in other embodiments, it is not necessary for the OSS 122 to be involved in creating the pool 127 of logical identifiers. In still other embodiments, the pool 127 of logical identifiers may be maintained by the authorization entity 142, and can be made accessible to the authorization entity 142 without needing to pass through the NAS 126.

Of course, it will be apparent to those skilled in the art that numerous modifications and variations of the infrastructure of FIG. 1 are possible. For example, in an alternative embodiment, the access multiplexer 106 can be omitted. This is especially true in the case where the host device 102 implements a wireless access point. In an example non-limiting embodiment of this scenario, the connection between the wireless access point and the NAS 126 can be provided by a dedicated point-to-point link.

Figure 2:
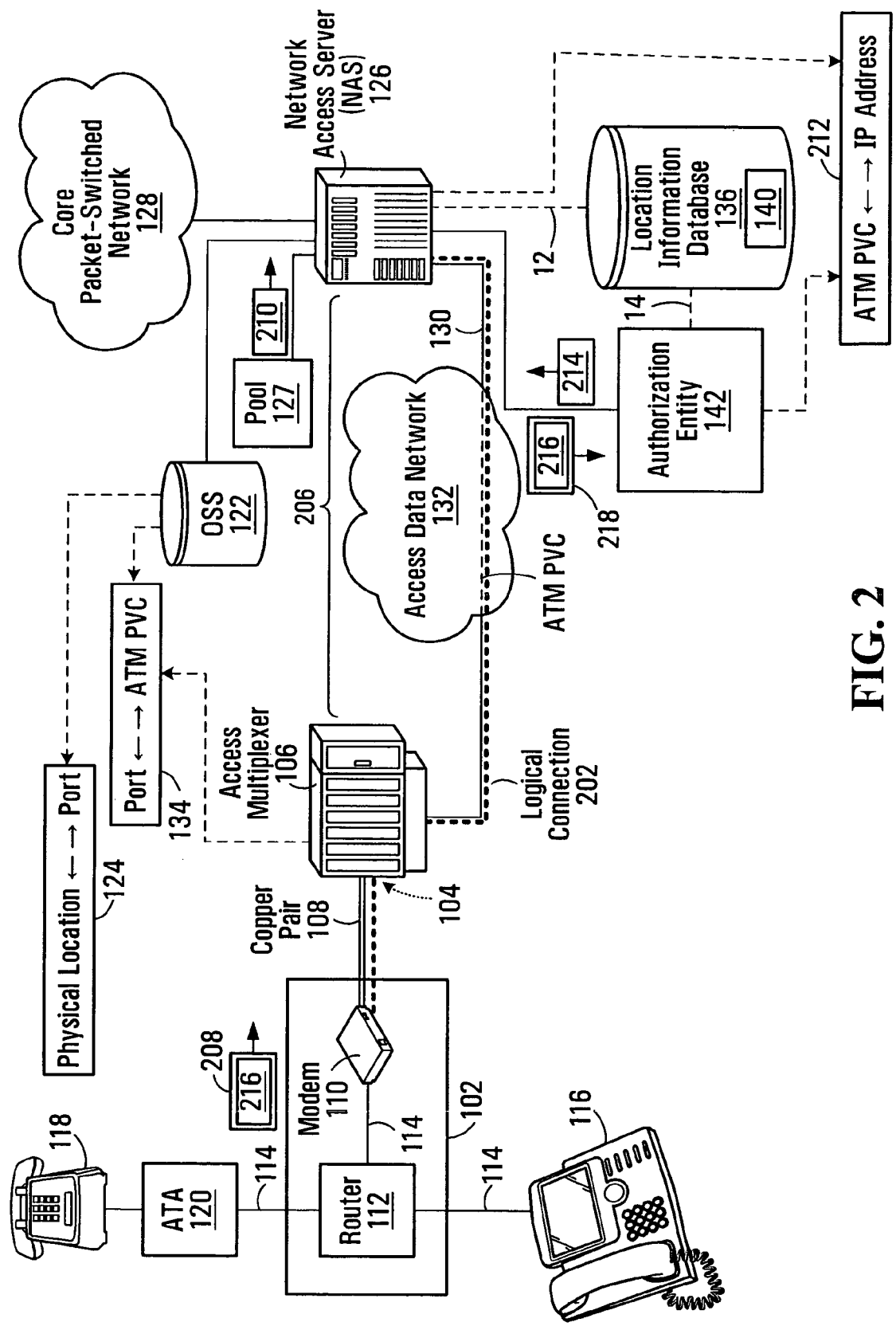
FIG. 2 shows an event flow upon activation of the host device.

Reference is now made to FIG. 2, which illustrates an event flow upon activation of the host device 102, which may occur as the modem 110 in the host device 102 is powered up. Thereafter:

The host device 102 establishes physical layer connectivity with the access multiplexer 106 over the physical communication link 108.

This is followed by the establishment of Ethernet connectivity between the host device 102 and the access multiplexer 106.

The host device 102 verifies its ability to communicate using Point-to-Point Protocol over Ethernet (PPPoE). For a more detailed explanation of PPPoE, the reader is referred to Internet Request For Comments (RFC) 2516, available from the Internet Engineering Task Force (http://www.ietf.org), hereby incorporated by reference herein.

Next, assuming that the host device 102 has the ability to communicate using PPPoE, the host device 102 verifies whether it should make a so-called "access request" automatically or in response to user input (which can be obtained via a software application). For the purposes of this example, let it be assumed that conditions have been met such that the host device 102 should make an access request.

The host device begins entry into PPPoE communication by broadcasting an "initiation" packet over the dedicated logical link 130.

The NAS 126 responds to receipt of the initiation packet by sending an "offer" packet to the host device 102. Thus, at this stage, it can be said that a logical connection 202 has been defined between a first endpoint (the host device 102) and a second endpoint (the NAS 126).

Following receipt of the offer packet, the host device 102 sends an access request 208 to the NAS 126 with the ultimate goal of accessing the core packet-switched data network 128 (e.g., for the purpose of making and receiving VoIP calls). In an example non-limiting embodiment, the access request 208 may comprise credentials 216 that can be hard coded or programmably installed on the host device 102. Alternatively, the credentials 216 may be entered by a user of the host device 102.

Upon receipt of the access request 208 containing the credentials 216 along the dedicated logical link 130, the NAS 126 executes an authorization procedure as follows. The NAS 126 communicates the credentials 216 to the authorization entity 142, e.g., in the form of a RADIUS Access-Request message 218. In response to receipt of the credentials 216 from the NAS 126, the authorization entity 142 determines whether the credentials 216 allow access to the core packet-switched data network 128. In a non-limiting example embodiment, this can be determined by consulting a database (not shown). If the credentials 216 allow access to the core packet-switched data network 128, the authorization entity 142 returns an acceptance message (e.g., a RADIUS Access-Accept message). On the other hand, if the credentials 216 do not allow access to the core packet-switched data network 128, the authorization entity 142 returns a refusal message (e.g., a RADIUS Access-Reject message). Assume that the credentials 216 allow access to the core packet-switched data network 128, resulting in issuance of an acceptance message 214. Two alternatives are possible:

Alternative 1 (where the pool 127 of logical identifiers is maintained by the authorization entity 142): the authorization entity 142 obtains a logical identifier 210 from the pool 127 of logical identifiers that is maintained by the authorization entity 142. The logical identifier is sent to the NAS 126, which assigns the logical identifier 210 to the dedicated logical link 130.

Alternative 2 (where the pool 127 of logical identifiers maintained by the NAS 126): responsive to receipt of the acceptance message from the authorization entity 142, the NAS 126 obtains a logical identifier 210 from the pool 127 of logical identifiers that is maintained by the NAS 126. The logical identifier 210 so obtained is assigned by the NAS 126 to the dedicated logical link 130.

The NAS 126 sends a "confirmation" packet back to the host device 102, thus completing the establishment of a PPPoE session between the endpoints of the logical connection 202.

Additional hand-shaking may be performed between the host device 102 and the NAS 126 in order to establish a Point-to-Point Protocol (PPP) session between the endpoints of the logical connection 202.

Following this, further hand-shaking may be undertaken between the host device 102 and the NAS 126 in order to establish an Internet Protocol Control Protocol (IPCP) session between the endpoints of the logical connection 202.

During the IPCP session, the NAS 126 releases the logical identifier 210 towards the host device 102 that issued the access request 208, in order to allow the host device 102 to identify itself using the logical identifier in future communications over the dedicated logical link 130. For the purposes of the present example, let it be assumed that the logical identifier 210 assigned to the dedicated logical link 130 is an IP address, e.g., "208.106.88.104" or any other conceivable IP address.

It is recalled from the above that once the logical identifier 210 has been obtained from the pool 127 of logical identifiers (either by the NAS 126 or by the authorization entity 142), the NAS 126 assigns the logical identifier 210 to the dedicated logical link 130.

In a first implementation, namely where the location information database 136 is connected to the NAS 126 by the link 12, the fact that the NAS assigns the logical identifier 210 to the dedicated logical link 130 allows the NAS 126 to construct and maintain a mapping 212 between, on the one hand, various dedicated logical links (such as the dedicated logical link 130 and others) and, on the other, logical identifiers corresponding to those dedicated logical links.

In a second implementation, namely where the location information database 136 is connected to the authorization entity 142 by the link 14, the logical identifier 210 and the identity of the dedicated logical link 130 to which it is assigned are sent back by the NAS 126 to the authorization entity 142, and it is the authorization entity 142 that maintains the aforementioned mapping 212 between dedicated logical links and logical identifiers corresponding to those dedicated logical links.

Of course, those skilled in the art will be able to think of other ways of causing the host device 102 to send the access request 208 over the logical connection 202 between the host device 102 and the NAS 126, as well as other ways of assigning a logical identifier to the dedicated logical link 130, and such other ways should be considered as being within the scope of the present invention. It should further be mentioned that the establishment of the aforementioned PPPoE, PPP and/or IPCP sessions is not a requirement of the present invention. This is particularly the case where the dedicated logical link 130 is a VLAN.

In view of the preceding description, and in particular given the previously described mappings 124, 134 maintained in the OSS 122 and/or the access multiplexer 106 and the mapping 212 maintained in the NAS 126 or the authorization entity 142, the following describes how one can create an association between logical identifiers (such as IP addresses) and respective location objects each indicative of a physical location.

Figure 3:
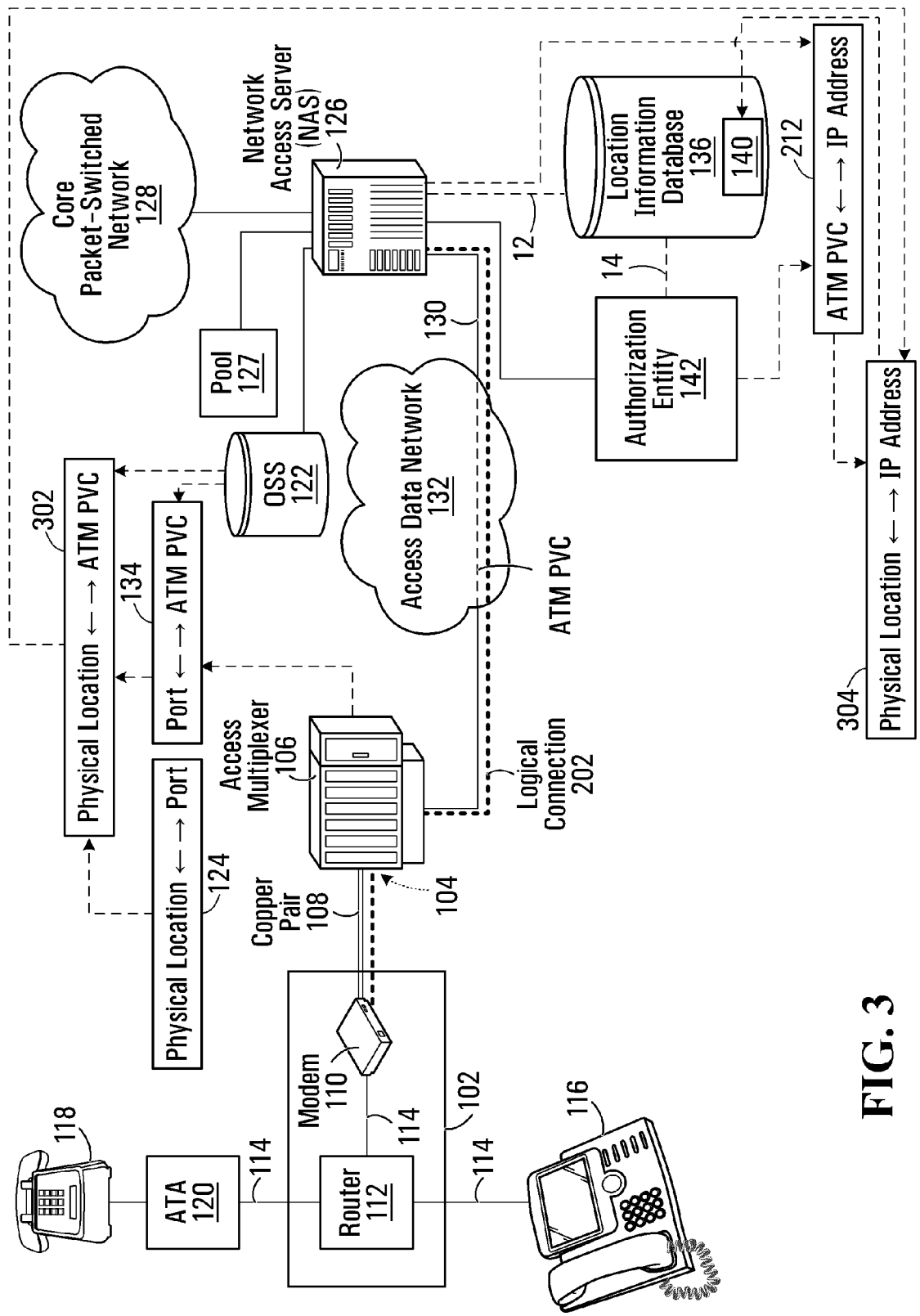
FIG. 3 shows creation of an association between a physical location of the host device and a logical identifier assigned to the host device.

Specifically, with reference to FIG. 3, by combining the mapping 124 with the mapping 134, the OSS 122 can create an intermediate mapping (denoted 302) between, on the one hand, dedicated logical links and, on the other hand, location objects indicative of respective physical locations of host devices having logical connections with the NAS 126 which traverse those dedicated logical links. In the specific example being considered here, the intermediate mapping 302 would associate the dedicated logical link 130 to the physical location of the host device 102. In an example non-limiting embodiment, the OSS 122 transmits the intermediate mapping 302 to the location information database 136.

Next, the location information database 136 can be operative to combine the intermediate mapping 302 (received from the OSS 122) with the previously described mapping 212 (received from the NAS 126 or the authorization entity 142), thus creating a final mapping 304 between, on the one hand, logical identifiers (such as IP addresses) and, on the other, location objects indicative of the respective physical locations of host devices having logical connections with the NAS 126 which traverse respective dedicated logical links to which those logical identifiers have been assigned. In the specific example being considered here, the final mapping 304 would specify that IP address 208.106.88.104 corresponds to the physical location of the host device 102. This is precisely the type of association that is useful to have stored in the location information database 136.

In an alternative embodiment, the OSS 122 can forward the mapping 124 and the mapping 134 to the location information database 136. In this alternative embodiment, the location information database 136 can be responsible for creating the intermediate mapping 302. In yet further embodiments, the OSS 122 can forward the mapping 124 and the mapping 134 to an intermediate computing apparatus that can be responsible for creating the intermediate mapping 302 and for forwarding the intermediate mapping 302 to the location information database 136.

From the above, it should be apparent that the location information database 136 can be populated with logical identifiers (such as IP addresses) and corresponding location objects indicative of respective physical locations associated with those logical identifiers.

Emergency Services

One non-limiting example of the usefulness of the information stored in the records 140 of the location information database 136 is in the context of emergency services. In what follows, only a cursory overview of an emergency call flow will be provided, as a person skilled in the art will recognize that additional information can be obtained from document NENA 08-001, Issue 1, Dec. 6, 2005, entitled "Interim VoIP Architecture for Enhanced 9-1-1 Services (i2)", hereby incorporated by reference herein.

Figure 4:
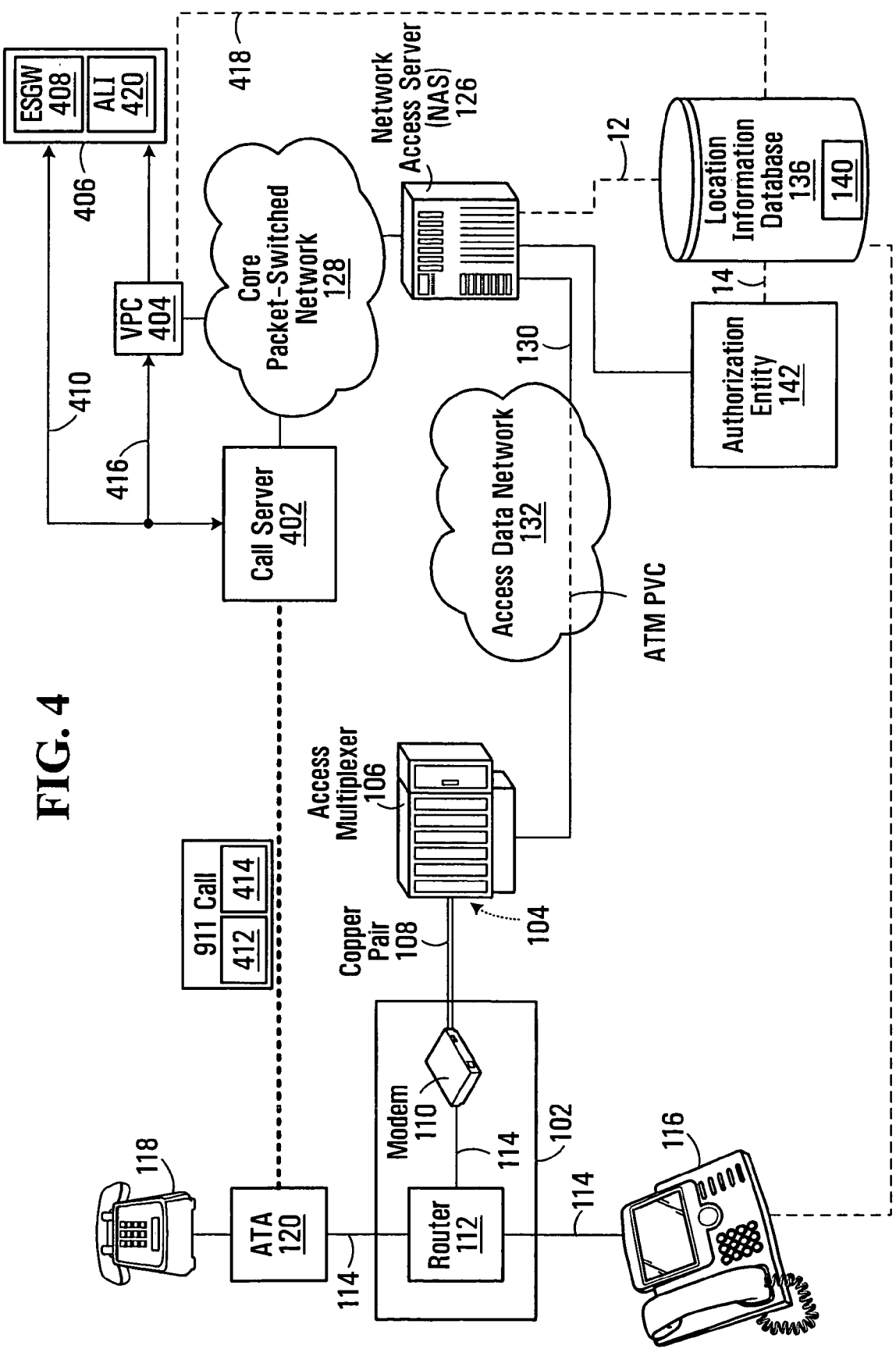
FIG. 4 shows origination and flow of an emergency call.

With reference to FIG. 4, there is provided a call server 402, a VoIP positioning center (VPC) 404 and an emergency services provider network 406. The call server 402 is reachable via the core packet-switched data network 128. In an example non-limiting embodiment, the call server 402 is embodied as a MCS 5200 Soft Switch manufactured by Nortel Networks Ltd. of 8200 Dixie Road, Brampton, Ontario L6T 5P6, Canada. Generally speaking, the call server 402 provides communication services and features for (i) connecting incoming calls to the host device 102 and (ii) handling outgoing calls originated from the host device 102. In the case of an emergency call received at the call server 402, the call server 402 is operable to obtain call-related information and to route the emergency call together with the call-related information towards an emergency services gateway (ESGW) 408 in the emergency services provider network 406 via an interface 410.

Consider now an emergency call being originated from the host device 102. The emergency call comprises a call initiation portion 412 and ancillary information 414.

In a first implementation, the ancillary information 414 comprises a location object indicative of the physical location of the host device 102. It should be appreciated that in such an implementation, the location object comprised in the ancillary information 414 may be obtained by the host device 102 by virtue of direct interaction with the location information database 136 either before or during origination of the emergency call.

In a second implementation, the ancillary information 414 comprises a logical identifier (such as an IP address or proprietary identifier) associated with the host device 102. It is recalled that the logical identifier in question can be received from the NAS 126 as a consequence of the host device 102 having been authorized to access the core packet-switched data network 128. When the emergency call is received at the call server 402, the call server 402 obtains call-related information by querying the VPC 404 on the basis of the ancillary information 414.

Specifically, the VPC 404 is a network element that conveys routing information to support the routing of VoIP emergency calls. The VPC 404 receives the ancillary information 414 from the call server 402 over an interface 416. If the ancillary information 414 is a logical identifier (i.e., in the second implementation mentioned above), the VPC 404 is operable to obtain the corresponding location object from the location information database 136. Accordingly, in this second implementation, an interface 418 is provided between the VPC 146 and the location information database 136. The interface 418 is not required when the ancillary information 414 already comprises the location object.

Based on the location object (either contained in the ancillary information 414 or obtained from the location information database 136), the VPC 404 queries an Emergency Routing Data Base (ERDB, not shown) for routing information relating to the emergency call. In an example, the routing information may be in the form of an emergency services query key (ESQK) and an emergency services routing number (ESRN), which are returned to the call server 402. In addition, the ESQK is pushed to an ALI database 420 in the emergency services provider network 406. Meanwhile, the VPC 404 stores the ESQK and the aforementioned location object along with the callback number of the host device 102.

Upon receipt of the ESQK and the ESRN from the VPC 404, the call server 402 routes the emergency call based on the ESRN as the routing path identifier and uses the ESQK as the calling number going to the ESGW 408. The emergency call with the ESQK is then routed to a PSAP via an appropriate PSTN selective router (not shown). At the PSAP, an operator queries the ALI database 420 with the ESQK. In turn, the ALI database 420 queries the VPC 404 with the ESQK to obtain the location object that had been stored by the VPC 404 in association with that ESQK. In this way, the PSAP operator learns the physical location of the host device 102 from which the emergency call was originated.

Non-Emergency Location-Based Services

Figure 5:
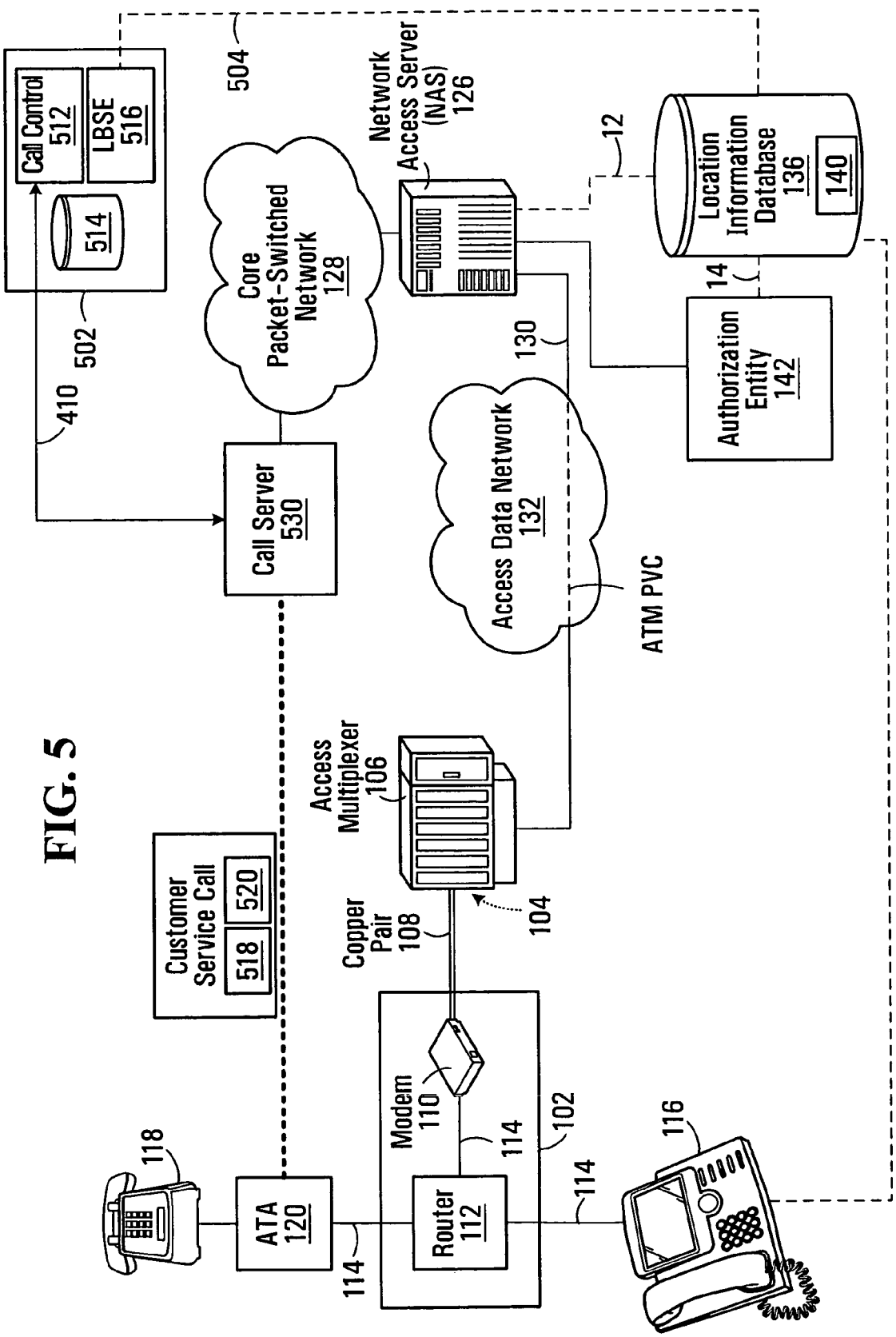
FIG. 5 shows origination and flow of a customer service call.

Another non-limiting example of the usefulness of the information stored in the records 140 of the location information database 136 is in the context of location-based services other than emergency services. With reference to FIG. 5, let a specific non-limiting example location-based service be "customer service", which is provided by a customer service entity 502. The customer service entity 502 comprises a call control portion 512 (for receiving the customer service call), a database 514 and a location-based services entity (LBSE) 516.

Also provided in the infrastructure of FIG. 5 is a call server 530, which is reachable via the core packet-switched data network 128. The call server 530 provides communication services and features for (i) connecting incoming calls to the host device 102 and (ii) handling outgoing calls originated from the host device 102.

Consider now a customer services call being originated from the host device 102. The customer service call comprises a call initiation portion 518 (including, for example, a directory number where the customer service entity 502 can be reached, as well as a call origination number at which the phone 116 or 118 can be reached) and ancillary information 520. The call initiation portion 518 causes the customer service call (including the ancillary information 520) to be routed to the customer service entity 502. The ancillary information 520 is processed by the call control portion 512 and forwarded to the LBSE 516.

In a first implementation, the ancillary information 520 comprises a location object indicative of the physical location of the host device 102. It should be appreciated that in such an implementation, the location object comprised in the ancillary information 520 may be obtained by the host device 102 by virtue of direct interaction with the location information database 136 either before or during origination of the customer service call.

In a second implementation, the ancillary information 520 comprises a logical identifier (such as an IP address or proprietary identifier) associated with the host device 102. It is recalled that the logical identifier in question can be received from the NAS 126 as a consequence of the host device 102 having been authorized to access the core packet-switched data network 128. The LBSE 516 communicates with the location information database 136 over a link 504, which can be physical or logical. Specifically, the LBSE 516 queries the location information database 136 with the logical identifier in order to obtain the corresponding location object stored in the location information database 136. Due to the manner in which the location information database 136 is populated, the location object obtained by the LBSE 516 will represent the location of the host device 102.

Assuming that the location of the host device 102 has been obtained, the LBSE 516 can then automatically determine language preferences (e.g., French for calls originated from locations in the province of Quebec, Spanish for calls originated from locations in a certain neighborhood or country, etc.).

Alternatively or in addition, in a non-limiting example, the LBSE 516 can access a user profile stored in a database 514 (based on, e.g., the aforementioned call origination number in the call initiation portion 518) and if the address has changed, verify with the user if the address in the user profile should be updated (for billing purposes, etc.).

Alternatively or in addition, in a non-limiting example, the LBSE 516 can access a user profile stored in the database 514 (based on, e.g., the aforementioned call origination number in the call initiation portion 518) and retrieve current promotions applicable to the user's geographical location.

Alternatively or in addition, in a non-limiting example, the LBSE 516 can access a user profile stored in the database 514 (based on, e.g., the aforementioned call origination number in the call initiation portion 518) and retrieve data representative of services available in the user's geographical area to enable a customer services representative to more precisely target his or her up-sell pitch.

Those skilled in the art will appreciate that certain functionality of the NAS 126, the location information database 136 and/or other elements of the infrastructure described herein may be implemented as pre-programmed hardware or firmware elements (e.g., application specific integrated circuits (ASICs), electrically erasable programmable read-only memories (EEPROMs), etc.), or other related components. In other embodiments, certain portions of the NAS 126, the location information database 136 and/or other elements may be implemented as an arithmetic and logic unit (ALU) having access to a code memory (not shown) which stores program instructions for the operation of the ALU. The program instructions could be stored on a medium which is fixed, tangible and readable directly by the NAS 126, the location information database 136 and/or other elements, (e.g., removable diskette, CD-ROM, ROM, fixed disk, USB drive), or the program instructions could be stored remotely but transmittable to the NAS 126, the location information database 136 and/or other elements via a modem or other interface device.

While specific embodiments of the present invention have been described and illustrated, it will be apparent to those skilled in the art that numerous modifications and variations can be made without departing from the scope of the invention as defined in the appended claims.

The invention claimed is:

1. A method of populating a location information database for use in providing a location-based service to a host device that is an endpoint of a logical connection between the host device and a network access server, comprising:
  receiving from said host device over said logical connection a request for network access;
  assigning a logical identifier to said host device in response to said receiving;
  determining a physical location associated with said endpoint of said logical connection;
  creating an association between said logical identifier and said physical location;
  storing said association in the location information database; and
  sending said logical identifier to said host device subsequent to said determining.

2. The method defined in claim 1, further comprising:
  transmitting said logical identifier and said physical location to a computing apparatus.

3. The method defined in claim 2, said computing apparatus performing said creating and said storing.

4. The method defined in claim 3, said computing apparatus being implemented as a location information database.

5. The method defined in claim 1, wherein said receiving is performed by the network access server.

6. The method defined in claim 1, wherein said logical identifier comprises an IP address.

7. The method defined in claim 1, wherein said logical connection traverses (i) a first physical portion between said host device and a port of an access multiplexer; and (ii) a second physical portion between said access multiplexer and said network access server.

8. The method defined in claim 7, wherein a dedicated logical link for supporting said logical connection is established over said second portion.

9. The method defined in claim 8, wherein said dedicated logical link comprises an Asynchronous Transfer Mode (ATM) Permanent Virtual Circuit (PVC).

10. The method defined in claim 9, wherein said logical connection is implemented using PPPoE.

11. The method defined in claim 8, wherein said dedicated logical link comprises a virtual local area network (VLAN).

12. The method defined in claim 8, wherein said first portion comprises at least one of a copper pair, a fiber optic cable, a coax cable and a wireless link.

13. The method defined in claim 1, wherein said network access server is operative to provide access to a core packet-switched network.

14. The method defined in claim 1, wherein said host device comprises a router and a broadband modem.

15. The method defined in claim 14, wherein said router provides a connection to at least one IP-enabled telephony system.

16. The method defined in claim 15, wherein said at least one IP-enabled telephony system comprises at least one of (a) an IP-phone; (b) an analog terminal adapter connected to a POTS phone; and (c) a computer implementing an IP telephony software application.

17. The method defined in claim 1, wherein said host device comprises a wireless access point.

18. The method defined in claim 8, further comprising:
  consulting a mapping of dedicated logical links to logical identifiers on the basis of the logical identifier assigned to said host device, thereby to obtain an identity of the dedicated logical link supporting said logical connection of which said host device is an endpoint.

19. The method defined in claim 18, further comprising:
  querying an operation support system with said identity of the dedicated logical link supporting said logical connection of which said host device is an endpoint, the operation support system maintaining a mapping of physical locations to respective dedicated logical links, thereby to obtain said physical location associated with said endpoint of said logical connection.

20. The method defined in claim 19, wherein said creating is implemented by said operation support system.

21. The method defined in claim 1, wherein said physical location comprises a civic address.

22. The method defined in claim 1, wherein said physical location comprises geo-spatial coordinates.

23. The method defined in claim 1, wherein said assigning comprises said network access server selecting said logical identifier from a set of pre-allocated logical identifiers.

24. The method defined in claim 1, wherein said request for network access comprises credentials.

25. The method defined in claim 24, further comprising attempting to authorize said host device based on said credentials.

26. The method defined in claim 25, wherein said assigning is performed only in response to successful authorization of said host device.

27. The method defined in claim 26, wherein said assigning comprises causing said authorization entity to select said logical identifier from a set of pre-allocated logical identifiers.

28. The method defined in claim 27, wherein said assigning is performed by the network access server.

29. The method defined in claim 26, wherein said attempting to authorize is performed by an authentication, authorization and accounting (AAA) server.

30. The method defined in claim 29, wherein said assigning is performed by the authentication, authorization and accounting (AAA) server.

31. A method, comprising:
  for each of a plurality of host devices, populating a location information database in accordance with the method of claim 1;
  receiving from a particular host device a call specifying a particular logical identifier;
  consulting the location information database to determine a physical location associated with the particular logical identifier.

32. The method defined in claim 31, wherein said call is an emergency call.

33. The method defined in claim 32, further comprising:
  routing the call to an emergency operator; and
  rendering available to the emergency operator said physical location associated with the particular logical identifier.

34. A method, comprising:
for each of a plurality of host devices, populating a location information database in accordance with the method of claim 1;
receiving from a particular host device a particular logical identifier;
consulting the location information database to determine a physical location associated with the particular logical identifier;
sending to the particular host device the physical location associated with the particular logical identifier;
when placing a call, the host device specifying the physical location associated with the particular logical identifier.

35. A method of populating a location information database for use in providing a location-based service to a host device that is an endpoint of a logical connection between the host device and a network access server, comprising:
receiving from said host device over said logical connection a request for network access;
assigning a logical identifier to said host device in response to said receiving;
providing said logical identifier to a computing apparatus capable of: (i) determining a physical location associated with said endpoint of said logical connection; (ii) creating an association between said logical identifier and said physical location; (iii) storing said association; and (iv) sending said logical identifier to said host device subsequent to said determining.

36. The method defined in claim 35, wherein said computing apparatus is a location information database.

37. A method of populating a location information database for use in providing a location-based service, comprising:
receiving a logical identifier assigned to a host device in response to receiving a request for network access from said host device over a logical connection having a first endpoint that is the host device and a second endpoint that is a network access server;
determining a physical location associated with said endpoint of said logical connection;
creating an association between said logical identifier and said physical location;
storing said association in the location information database; and
sending said logical identifier to said host device subsequent to said determining.

38. Apparatus for populating a location information database for use in providing a location-based service to a host device that is an endpoint of a logical connection between the host device and a network access server, comprising at least one arithmetic and logic unit (ALU) and a memory, the ALU and memory configured to implement:
a receiving unit configured to receive from said host device over said logical connection a request for network access;
an assigning unit configured to assign a logical identifier to said host device in response to said receiving;
a determining unit configured to determine a physical location associated with said endpoint of said logical connection;
a creating unit configured to create an association between said logical identifier and said physical location;
a storing unit configured to store said association in the location information database; and
a sending unit configured to send said logical identifier to said host device subsequent to said determining.

39. The apparatus defined in claim 38, wherein:
the receiving unit is implemented by a network access server;
the assigning unit is implemented by either the network access server or an authorization entity;
the determining unit is implemented by an operation support system;
the creating unit is implemented by either the operation support system or the location information database;
the storing unit is implemented by the location information database.

\* \* \* \* \*